United States Patent
Sellers

(10) Patent No.: US 9,186,588 B1
(45) Date of Patent: Nov. 17, 2015

(54) GAME WITH AN AREA OF EFFECT FOR STRUCTURES IMPACTING A SURROUNDING AREA

(71) Applicant: KABAM, INC., San Francisco, CA (US)

(72) Inventor: Michael Sellers, Pacifica, CA (US)

(73) Assignee: Kabam, Inc., San Francisco, CA (US)

( * ) Notice: Subject to any disclaimer, the term of this patent is extended or adjusted under 35 U.S.C. 154(b) by 177 days.

(21) Appl. No.: 13/781,567

(22) Filed: Feb. 28, 2013

(51) Int. Cl.
- A63F 13/822 (2014.01)
- A63F 9/24 (2006.01)
- A63F 13/53 (2014.01)

(52) U.S. Cl.
CPC .............. *A63F 13/822* (2014.09); *A63F 9/24* (2013.01); *A63F 13/53* (2014.09)

(58) Field of Classification Search
USPC .......................................................... 463/9
See application file for complete search history.

(56) References Cited

U.S. PATENT DOCUMENTS

| | | | |
|---|---|---|---|
| 6,533,663 B1 | 3/2003 | Iwao et al. | 463/32 |
| 7,044,854 B2* | 5/2006 | Abecassis et al. | 463/9 |
| 7,445,549 B1 | 11/2008 | Best | 463/32 |
| 7,707,012 B2 | 4/2010 | Stephens | 703/2 |
| 8,109,818 B2 | 2/2012 | Pottinger et al. | 463/9 |
| 8,145,702 B2* | 3/2012 | Patterson | 709/203 |
| 8,668,563 B1 | 3/2014 | Reynolds et al. | 463/9 |
| 8,668,588 B2* | 3/2014 | Yang et al. | 463/42 |
| 8,708,790 B2* | 4/2014 | Eddy et al. | 463/9 |
| 2002/0198033 A1 | 12/2002 | Wen et al. | 463/9 |
| 2003/0008696 A1* | 1/2003 | Abecassis et al. | 463/9 |
| 2007/0206016 A1 | 9/2007 | Szymanski et al. | 345/473 |
| 2007/0206023 A1 | 9/2007 | Street et al. | 345/582 |
| 2007/0207844 A1* | 9/2007 | Pottinger et al. | 463/9 |
| 2007/0207860 A1 | 9/2007 | Yamauchi et al. | 463/42 |
| 2007/0254741 A1* | 11/2007 | Lim et al. | 463/42 |
| 2008/0004116 A1 | 1/2008 | Van Luchene et al. | 463/42 |
| 2008/0004118 A1 | 1/2008 | Van Luchene et al. | 463/42 |
| 2008/0125220 A1 | 5/2008 | Sakaguchi | 463/32 |
| 2009/0253517 A1* | 10/2009 | Bererton et al. | 463/42 |
| 2009/0318234 A1 | 12/2009 | Christensen et al. | 463/42 |
| 2012/0122589 A1 | 5/2012 | Kelly et al. | 463/42 |

(Continued)

OTHER PUBLICATIONS

Anno 1701 Video Game Handbook, retrieved from <<url:http:\\www.replacementdocs.com>>.*

(Continued)

*Primary Examiner* — Damon Pierce
*Assistant Examiner* — Anh Vo V Nguyen
(74) *Attorney, Agent, or Firm* — Sheppard, Mullin, Richter & Hampton, LLP

(57) ABSTRACT

Users may build structures having an area of effect surrounding the structure in a game as a result of in-game actions. In-game actions may include building an instance of a structure controlled by a user. The structure may have an associated area of effect configured to impact at least one of resource accumulation, structure properties, and event frequency within the area of effect. The area of effect may be presented on a map with information relating to its impact. The area of effect may impact the cost of building other buildings therein, the rate at which resources are accumulated therein, the defensive ratings of other buildings therein, the effectiveness of other buildings therein in carrying out an intended functionality, and the frequency at which various positive or negative events occur therein. Some buildings can only be built within the area of effect of a specific other building.

18 Claims, 6 Drawing Sheets

(56) References Cited

U.S. PATENT DOCUMENTS

2013/0053149 A1    2/2013    Rouse et al. .................... 463/42
2013/0178281 A1    7/2013    Ayyar et al. .................... 463/30

OTHER PUBLICATIONS

Adam King, "A guide to Dawn of Discovery for the Wii", GameFAQs.com, retrieved from <<url: http://www.gamefaqs.com/wii/958390-dawn-of-discovery/faqs/58550>>.*

"Let's Play Anno 1701", Youtube.com, retrieved from <<url:https://www.youtube.com/watch?v-R2LzEgK9YM>>.*

Pylon, From Liquipedia Starcraft 2 Wiki, http://wiki.teamliquid.net/starcraft2/index.php?title=Pylon&oldid=224707, printed Nov. 7, 2012, 4 pages.

"Anno 1404 Wiki—Diplomacy", Wikia.com, retrieved from URL:http://anno1404.wikia.com/wiki/Diplomacy, 4 pages, published date of Sep. 3, 2011.

Warfreak, "GameFAQs: Dawn of Discovery (PC) FAQ/Walkthrough", GameFAQs.com, retrieved from URL:http://www.gamefaqs.com/pc/952498-dawn-of-discovery/faqs/57857, 53 pages, published date of Feb. 21, 2012.

* cited by examiner

GAME WITH AN AREA OF EFFECT FOR STRUCTURES IMPACTING A SURROUNDING AREA

FIELD OF THE DISCLOSURE

This disclosure relates to games having simulated cities, in which structures within the city have an area of effect impacting their surroundings.

BACKGROUND

In conventional strategy-based virtual games, a user may exercise control over an area of a virtual space. Within that area of control, the user may build structures in order to assist the user in conquering territory, defeating the units of other users, or otherwise achieving the user's in-game objectives. The user's structures may be clustered primarily or solely within cities.

In conventional virtual games, a city may include different structures such as walls, streets, or buildings that serve different purposes in the game. For example, buildings may be houses that support character units, generate character units, increase resources, increase the capabilities of the character units, increase the rate at which resources are obtained, and/or decrease the rate at which resources are expended. In conventional virtual games, there are no restrictions regarding the placement of structures within in-game cities. Alternatively, in conventional games a structure may have a required position with respect to another structure, for example an annex of a building may be required to be positioned adjacent to that building. These limited placement restrictions may result in simplistic and unrealistic city building. Accordingly, alternative approaches regarding the positioning of structures in virtual games may be advantageous to provide a more realistic and immersive gameplay.

SUMMARY

One aspect of this disclosure relates to a system configured to instantiate an area of effect of a structure in a virtual space that impacts a user's in-game capabilities, in accordance with one or more implementations. Structures within an in-game city may have an area of effect that impacts a spatial region surrounding the structure. The area of effect may permit a structure of a certain type to be built, impact the functionality or effectiveness of other structures, impact the rate of expenditure and/or collection of resources, and/or impact the cost of other structures. Users may advantageously design the layout of an in-game city to efficiently and/or effectively utilize an area of effect. Implementations may be configured for users to create in-game cities that simulate real world cities, where structures impact their surroundings. To this end, implementations include systems that may be configured to provide more engaging and immersive in-game experiences.

In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program modules to provide one or more games to users (or players). The computer program modules may include one or more of a game module, a city module, a communication module, an area of effect module, a map overlay module, and/or other modules. It is noted that the client computing platforms may include one or more computer program modules that are the same as or similar to the computer program modules of the server(s) to facilitate in-game actions.

The game module may be configured to execute an instance of a game to facilitate presentation of the game to a first user. The game module may be configured to implement in-game actions in the instance of the game in response to action requests for the in-game actions by the first user. The game module may also be configured to execute an instance of a city in the game in response to the in-game actions by the user. It should be understood that the term "city" as used herein is not intended to be limiting, but rather exemplary of a defined spatial area over which a user exerts control, and that any term for a defined spatial area could be substituted depending on the particular gameplay of a given implementation. For example, planets, colonies, countries, amusement parks, biological cells, or any spatial areas where gameplay takes place could be used instead of cities. In some implementations, there may not be distinct cities or the like, but instead simply a defined spatial area of a map or the like over which a user exerts control. The city may include a number of user-controlled elements, such as character units and/or structures that serve different purposes in the game. For example, some structures may be buildings such as houses, and each house may support a number of character units that respond to in-game actions of the user.

Consistent with use of the term "city", the term "build" is used herein to indicate any process by which a structure is brought into being within a virtual space. In various implementations with varying types of gameplay, in-game structures may be grown, teleported from another dimension, summoned or created magically, etc. Each such process results in a new structure within the virtual space and is encompassed by the term "building."

The term "structure" is used herein to refer to any semi-permanently fixed-location user-controlled element. Typical structures include buildings, fortifications, roads, and the like, but may in various embodiments include living growths, etc.

The communication module may be configured to obtain action requests input by users in response to users interacting with interfaces associated with client computing platforms. The action requests may specify execution of in-game actions by the user.

The area of effect module may be configured to generate an area of effect associated with a structure within a city. The area of effect may be a spatial region that is proximate to the structure that impacts in-game capabilities of the user.

The map overlay module may be configured to present areas of effect and their impact on the spatial regions they cover. If a user decides to construct a structure in-game, a set of map overlays presenting the impact of the area of effect of the structure and/or the cost of the structure in various locations may be presented to the user. In implementations, the map overlay module may present the size and shape that the area of effect of the desired building would have.

In implementations, the map overlay module may be configured to adjust a cost in hard resources for other structures built within the area of effect. In implementations, the cost in hard resources for the other structures built within the area of effect of the structure may be a function of a structure type of the structure. For example, when a user chooses to build a manor structure and is deciding where to place it, a map overlay may appear that takes into account the area of effect of an existing castle, and shows that building the manor near the castle requires more hard resources, whereas building the manor near other manors requires fewer hard resources.

In implementations, the map overlay module may also be configured to determine the impact on the in-game capabilities of the user within the area of effect. The impact on the in-game capabilities of the user may include a change in a rate at which hard resources are obtained in-game, changes in soft resources, and changes in the types of structures that can be built within the area of effect.

In implementations, the area of effect may be a circular spatial region around a center of the structure. The radius of the circle may be any configurable distance and may be a function of a structure type of the structure and/or the functionality of the structure. In other implementations, the area of effect may extend primarily or only along a main axis of a structure, for example for a road or railroad structure. In implementations, the area of effect may be any shape, for example square, hexagonal, or oblong, for example in games having spatial regions that are divided into square or hexagonal grids, or spherical or cubic in a three-dimensional virtual space.

In implementations, to build a second structure in-game, the second structure may be required to be built within the area of effect of a structure that is already built in-game.

In implementations, the area of effect of the structure may increase or decrease a rate at which structures within the area of effect produce soft resources and/or a rate at which hard resources are obtained.

In implementations, the area of effect of the structure increases or decreases the frequency at which at least one of a negative and a positive event occurs therein.

In implementations, the area of effect of the structure increases or decreases the effectiveness of another building therein in carrying out an intended functionality.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
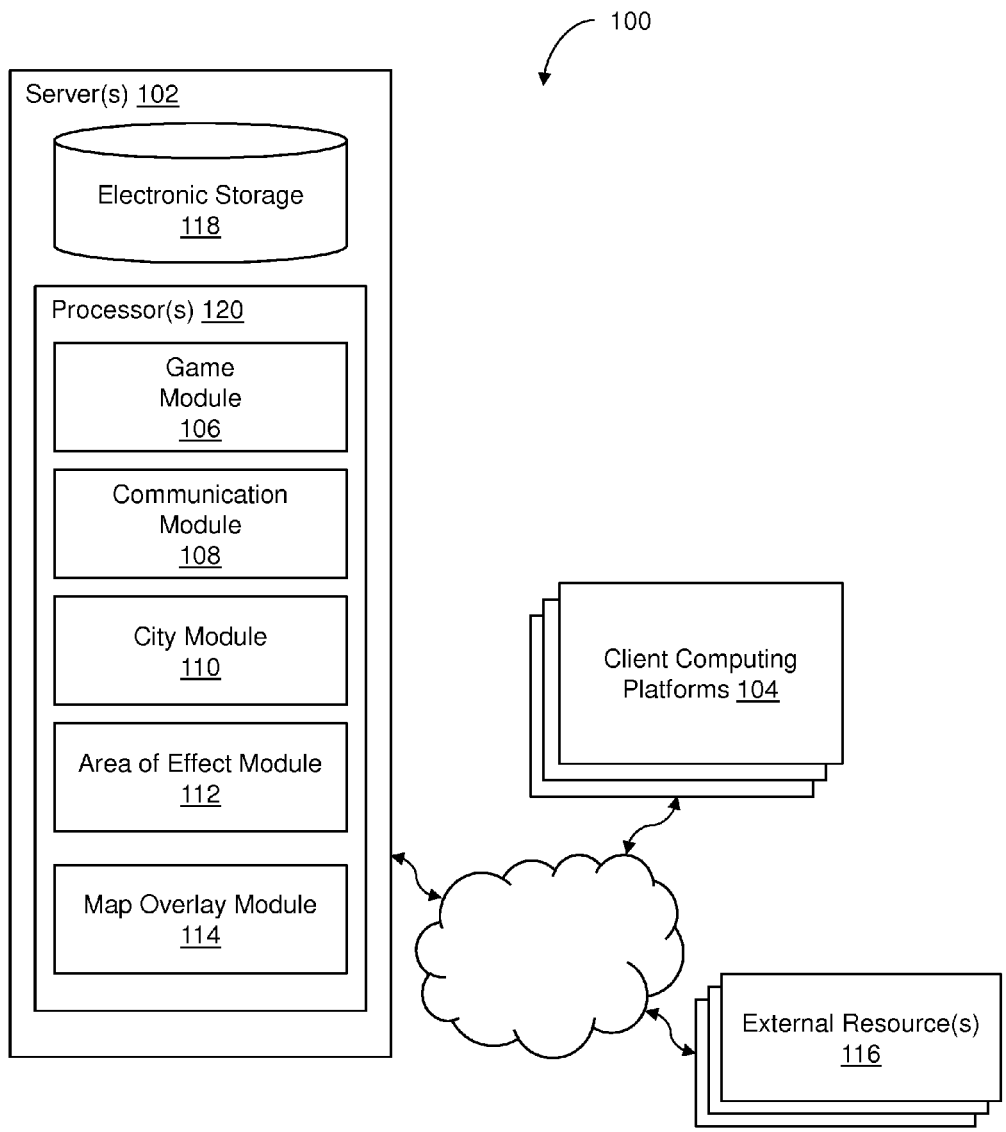
FIG. 1 illustrates a system configured to facilitate an area of effect for a structure, in accordance with one or more implementations.

FIG. 1 illustrates a system 100 configured to provide an area of effect for a structure in a virtual space. System 100 is only one example of a suitable computing environment and is not intended to suggest any limitation as to the scope of use or functionality of the features described herein. Providing the virtual space may include hosting the virtual space over a network.

In this disclosure, structures within an in-game city may have an area of effect surrounding the structure. The area of effect may impact the in-game abilities of user controlled elements, structures, and/or resources. In embodiments, the area of effect may permit a structure of a certain type to be built, impact the functionality or effectiveness of a structure, and/or impact a rate of expenditure and/or collection of resources. Responsive to the area of effect of structures, users may advantageously design the layout of an in-game city to efficiently and/or effectively utilize the area of effect associated with at least one structure. Accordingly, embodiments may be configured for users to create in-game cities that simulate real world cities where structures impact their surroundings, resulting in a virtual game that may provide more engaging and immersive in-game experiences.

In some implementations, system 100 may include one or more servers 102. The server(s) 102 may be configured to communicate with one or more client computing platforms 104 according to a client/server architecture. The users may access system 100 and/or the virtual space via client computing platform(s) 104, for instance, to engage in one or more games.

The server(s) 102 may be configured to execute one or more computer program modules. The computer program modules may include one or more of a game module 106, a communication module 108, city module 110, area of effect module 112, map overlay module 114, and/or other modules. As noted, the client computing platform(s) 104 may include one or more computer program modules that are the same as or similar to the computer program modules of the server(s) 102 to facilitate in-game actions.

The game module 106 may be configured to execute an instance of a game to facilitate presentation of the game to a user. The game module 106 may be configured to implement in-game actions in the instance of the game in response to requests for in-game actions by the first user. The game may be provided within a virtual space, and may include a plurality of resource types and/or maps. An instance of the virtual space may be executed by computer modules to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user-controlled element. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104.

Communications may be routed to and from the appropriate users through server(s) 102.

In various implementations, certain resource types of a plurality of resource types of the game may be "hard" resources which are gathered from the game environment (for example, from terrain features on a game map). Inventory levels of hard resources may be increased for a user through in-game and/or real-world actions initiated by the user. In implementations, in-game actions that may increase a user's inventory level of hard resources include directing a user-controlled element to harvest hard resources from a location in the virtual space (e.g. gathering timber from a forest), battling with other users, direct purchases of and/or trades for the hard resources, achievements of the user (e.g., getting to the next level, winning a battle, completing a mission, etc.), gambling by the user, and/or other actions initiated by the user. Real-world actions that may increase a user's inventory level of hard resources may include direct purchases using real-world funds or advertising the game over a social network. The efficiency of gathering hard resources may be based on a plurality of different factors, such as location of the resources within the virtual space, type of character unit gathering the resources, the proximity of the resources to a certain structure, etc. Such hard resources may be needed for generating certain types of structures, units, or other elements, or may influence soft resource levels, etc. Examples of hard resources include timber, oil, gold, spices, and the like.

In implementations, resource types of a plurality of resource types of the game may be "soft" resources, which are not gathered from the game environment, but rather are produced by structures or other user-controlled elements. Soft resources may include happiness, prosperity, and population, and may affect user-controlled element(s) such as cities, user characters, units and buildings to cause them to function at increased or diminished levels. For example, high levels of happiness may enhance user-controlled elements, causing military units to be better at defending and/or attacking other units, causing cities to build new buildings, develop new technology, and/or generate income faster, and/or causing buildings to create new units faster and/or with better characteristics, etc. Prosperity may enhance unit characteristics and/or rate of income generation. Population may influence income generation, the number of new units that can be created, and/or speed at which new buildings are built, etc. Soft resources may in turn depend on various elements, such as the existence of various types of structures (such as those providing housing, entertainment, healthcare, etc.), proximity of user-controlled elements to certain structures, availability of hard resources, current warfare, etc. For example, population may be generated by a combination of food resources and available housing structures.

The communication module 108 may be configured to obtain action requests input by users operating client computing platforms 104, wherein action requests specify execution of in-game actions.

The city module 110 may be configured to execute an instance of a city for a user. In response to a user's in-game actions, the city module 110 may generate a city for a user in the virtual space. A city may include a number of character units and structures that serve different purposes in the game, such as buildings, roads, and walls. Some buildings may be houses where each house may support a number of character units that the user controls. Another building may be a source of those character units, such as a keep or castle. Other buildings may serve as sources of soft resources, for example a church may increase happiness levels, a research laboratory may increase innovation levels, a bank may increase prosperity, etc. Roads may alter the speed of character unit's in-game movements. Walls may fortify a city and impede the movement of in-game character movements. Constructing character units and structures may require hard and/or soft resources in the game, such as food, wood, metal, etc. Further, structures may be required to be built as pre-requisites for building of other structures. Structures may serve to improve capabilities of a user's units, such as an armory that improves weapons for character units such as soldiers. Through area of effect module 112, or otherwise, the effects of structures may be limited to areas around the structures, and the effects may vary within those areas.

The area of effect module 112 may be configured to execute an area in close proximity to a structure that impacts in-game capabilities of the user, user-controlled elements, hard resources, and/or soft resources. In implementations, user-controlled elements such as cities, user characters, units, structures, and/or resources may be capable of functioning at increased or diminished levels responsive to whether their in-game location is within an area of effect of a structure. Therefore, it may be desired and/or required for a user to plan or reorganize the placement of structures and/or character units within the city so the in-game city more closely simulates a real city where the relative placement of various structures is important.

The area of effect associated with a structure may be any shape and/or size, and may vary depending on the type of structure. For example, roads, buildings, and/or walls may have differently sized and/or shaped areas of effect. In exemplary implementations, roads and walls may have an area of effect that extends along their main axis. The area of effect for buildings may be a circular spatial region around the center of a building, in which the radius of the circle may depend on the type of the building.

Further, the area of effect associated with a structure may impact in-game capabilities of the user, including hard, and/or soft resources within the area of effect depending on the function of the structure. The impact of the area of effect of a structure may vary, and may include the ability for the user to build other structures in-game. For example, in implementations, a user must first build a specific type of structure such as a castle or town hall before building other structures. The other structures may be required to be disposed within the area of effect of the castle or town hall. In addition, it may be required for a user to first build a barracks before the user can build in-game supplemental buildings, such as an archery range. Further, it may be required that the archery range is built within the area of effect of a specific structure, such as the barracks. This structural dependency may be cascading, for example a barracks may be required to be built within the area of effect of a castle, an archery range, military academy, and cavalry arena may be required to be built within the area of effect of a barracks, a horse training facility may be required to be built within the area of effect of a cavalry arena, etc. This may result in a realistic clustering of related structures within a city.

The areas of effect of structures may also impact the in-game cost of building and/or maintaining other structures. For example, in implementations, if a structure is built within a castle or town hall's area of effect the building of the new structure may cost less or more hard resources than if the structure was built in another spatial region.

Additionally, areas of effect may also impact the defensive rating of structures. In implementations, if a structure is positioned in a spatial region within an area of effect of a designated structure, the defensive rating of that structure may increase, making it less vulnerable to damage from, for example, combat units of opposing users or natural disasters such as fires or adverse weather events.

Areas of effect may also impact the rate at which hard resources are gathered from the game environment. In implementations, structures such as fisheries, mines, granaries, etc. may increase the rate of acquisition of at least one hard resource associated with the functionality of the structure. An area of effect may also impact the rate at which a structure produces soft resources. For example, an area of effect may increase prosperity, happiness, population, etc. produced by structures within that area.

An area of effect may also impact the effectiveness and/or efficiency of an intended functionality of a structure. In implementations, if the structure is a hospital, being located within the area of effect of another building may increase the rate at which it heals user-controlled elements, or if the structure is a barracks, being located within the area of effect of another building may increase the rate at which it trains military character units. The location of a structure may also impact the efficiency and/or effectiveness of the structure and/or other structures within the area of effect. For example, if the location of a hospital is within an area of effect of a structure that generates pollutants or other negative soft resources, the pollutants may inhibit the rate at which healing is performed by the hospital. Similarly, a barracks may impact the rate and/or effectiveness at which troops trained in an archery range within its area of effect learn a particular skill, such as archery.

In implementations, the impact of an area of effect may be binary, e.g. either affecting a structure or other user-controlled element within its area of effect or not affecting a user-controlled element if that element falls outside its area of effect, or non-binary. For example, the impact of a structure's area of effect may scale with distance from the center of the structure. So for example, an archery range might train archers four times as fast if located immediately adjacent to a barracks, three times as fast if separated from the barracks but within 50% of the radius of its area of effect from the center of the barracks, and two times as fast if located between 50% and 100% of the radius of the barracks' area of effect away from the center of the barracks.

The area of effect may also affect the rate of incidence of negative events, such as disease, fire, crime, sabotage, etc., and/or positive events, such as rain, a baby boom, etc. For example, a hospital might reduce the frequency of disease outbreaks within its area of effect, a fire station might reduce the frequency of building fires within its area of effect, and a police station might reduce the frequency of crime within its area of effect.

Each impact of an area of effect described may be either a positive or a negative impact. For example, while a fire station may reduce the frequency of fires within its area of effect, an ammunition depot might increase the frequency of fires within its area of effect. In implementations, the areas of effect associated with structures may have both positive and negative effects. For example, a gambling hall may increase the amount of prosperity within its area of effect, but may also increase the amount of crime within that area. In another example embodiment, a mine may increase a production rate of a hard resource within its area of effect, but may decrease a soft resource such as happiness for character units disposed within the area of effect.

When a structure is built in-game, area of effect module 110 is configured to determine a cost in hard resources required to build that structure. The cost of the structure may be a function of the location of the structure relative to other structures in-game. More specifically, the cost in hard resources associated with a new structure may depend on what current structures have an area of effect encompassing a desired in-game location for the new building. In implementations, if a user desires to build in-game a manor-house that is within the area of effect associated with a town hall, the hard resources required to build the manor may be increased.

However, if the user desires to build the manor house in-game at a location that is not within the area of effect of the town hall and/or any other structure, than the hard resources required to build the manor house may be decreased.

The area of effect of a structure may impact a user's in-game strategy of placement of other user-controlled elements and/or structures. For example, upon building a structure within a city, it may be advantageous for a user to build other structures within the area of effect of the structure, wherein the other structures may have functions that are complementary to the existing structure's functionality. For example, a chapel may provide a happiness soft resource that is complementary to a population soft resource provided by housing structures, such that it may be beneficial for homes to be built within the area of effect of the chapel. Accordingly, it may not be efficient to build business-related structures within the area of effect of the chapel because the business-related structures may not utilize the soft resources produced by the chapel effectively. Similarly, if a user decides to build an in-game chapel, it may be more beneficial to build the chapel in close proximity to a residential area than in close proximity to structures that have business and/or industrial functionalities. Analogously, in implementations it may be advantageous for a user to build business-related structures near other business-related structures to maximize resulting income generation. In some implementations, some nearby housing structures may be necessary to maximize the impact of other structures, representing the need for workers to use those structures. For example, farms might require nearby houses to supply farmers, banks might require nearby housing to provide a population to staff them, etc. Thus, a farm's food production or the prosperity bonus in a bank's area of effect might be impacted by the number of nearby housing structures.

The map overlay module 114 may be configured to present an area of effect associated with a structure. If a user decides to build a structure in-game, a set of map overlays presenting the impact of the area of effect of the structure and/or the cost of the structure may be presented to the user. In implementations, map overlay module 114 may present the size and the shape of the area of effect that the desired building would have. Further, map overlay module 114 may present the impact that the area of effect may have and the locations impacted. For example, map overlay module 114 may present information relating to an increase and/or decrease of production of hard resources, an impact on soft resources, and/or information associated with adjustments to the in-game capabilities of the user, such as new buildings that the user may construct. The map overlay module 114 may be configured to present the information associated with the impact of the structure and the cost of the structure in any known manner. In implementations, the information may be presented as layers, viewed individually in a toggle manner, etc.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a netbook, a smartphone, a gaming console, and/or other computing platforms.

The external resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

The server(s) 102 may include electronic storage 118, one or more processor(s) 120, and/or other components. The server(s) 102 may include communication lines or ports to enable the exchange of information with a network and/or other computing platforms. The illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of a system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. The processor(s) 120 may be configured to execute modules 106, 108, 106, 112, and/or other modules. The processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that are the same as or similar to the computer program modules of the server(s) 102. The given client computing platform 104 may include one or more processors that are the same or similar to processor(s) 120 of the server(s) 102 to execute such computer program modules of the given client computing platform 104. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114 are illustrated in FIG. 1 as being co-located within a single processing unit, in implementations in which processor(s) 120 includes multiple processing units, one or more of modules 106, 108, 110, 112, 114 may be located remotely from the other modules. The description of the functionality provided by the different modules 106, 108, 110, 112, 114 described below is for illustrative purposes, and is not intended to be limiting, as any of modules 106, 108, 110, 112, 114 may provide more or less functionality than is described. For example, one or more of modules 106, 108, 110, 112, 114 may be eliminated, and some or all of its functionality may be provided by other ones of modules 106, 108, 110, 112, 114. As another example, processor(s) 120 may be configured to execute one or more additional modules that may perform some or all of the functionality attributed below to one of modules 106, 108, 110, 112, 114.

Figure 2:
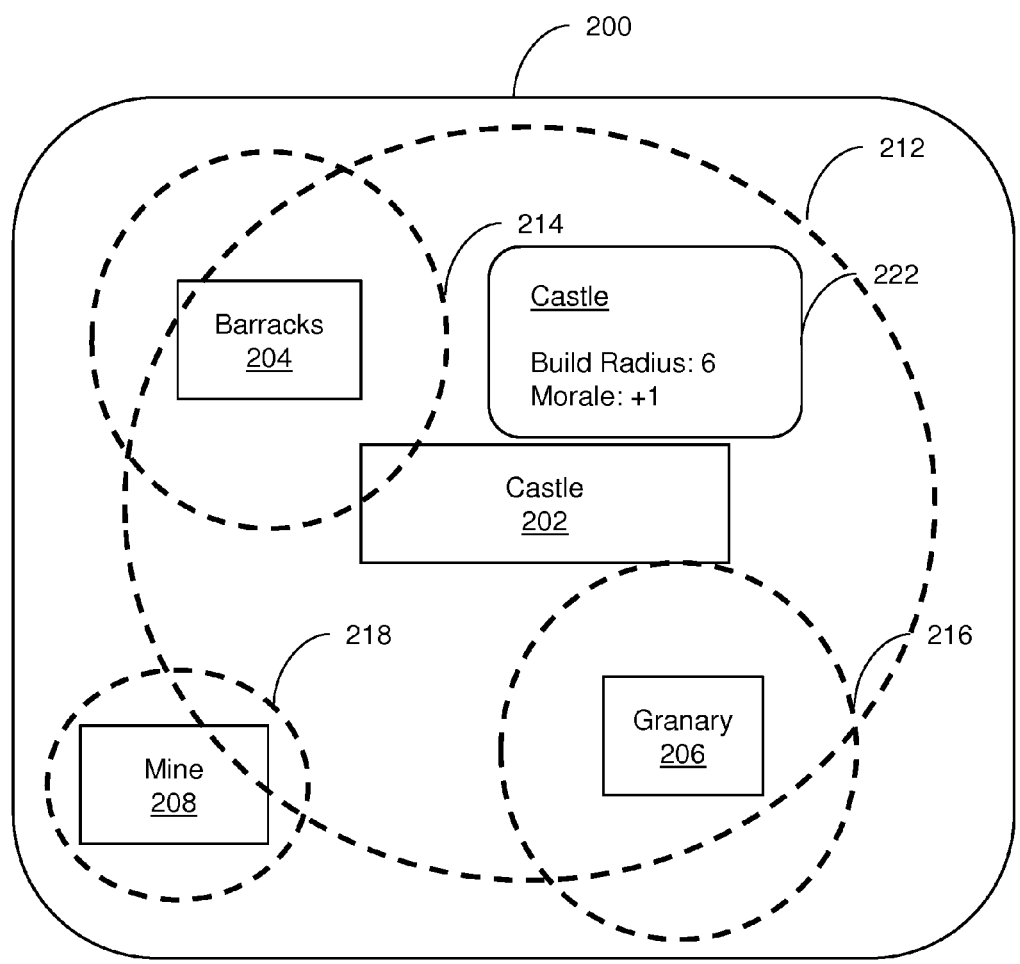
FIG. 2 illustrates a game scenario on a client computing platform depicting an area of effect of a structure, in accordance with one or more implementations.

FIG. 2 illustrates a game scenario of a city 200 generated by a server and presented on a client computing platform in response to in-game actions performed by a user, in accordance with one or more implementations. City 200 may be generated by a game module on a server in response to a user's actions on client computing platforms 104. As shown, city 200 may include a plurality of buildings that are controlled and maintained by a user, including a castle 202, barracks 204, granary 206, and mine 208. The buildings may have various functions allowing the user to build more user-controlled elements and/or may be associated with hard resources and/or soft resources. For example, granary 206 may allow a user to generate and/or maintain more character units and mine 208 may allow the user to obtain hard resources associated with ore. The buildings 202, 204, 206, and 208 may have areas of effect associated with them, referred to as 212, 214, 216, and 218, respectively. The areas of effect 212, 214, 216 and 218 may adjust the capabilities of user-controlled elements disposed within the areas. For example, a hard resource such as ore may be obtained at a faster rate if the ore is located within area of effect 218 associated with mine 208. As depicted in FIG. 2, different buildings have different sized area of effects. In other implementations, buildings may have the same size area of effect or may not have an area of effect.

If a user performs an in-game action associated with a structure within city 200, such as performing an action on an interface to interact in-game within user-controlled elements, information associated with an area of effect may be presented to the user. For example, in response to a user interacting with a touch screen and/or mouse of a client computing platform to perform in-game actions, information 222 about castle 202 and/or area of effect 212 may be presented on a display of the client computing platform. Information 222 may include data associated with the area of effect of castle 212, such as the impact on soft and/or hard resources within area of effect 212.

If a user performs an in-game action to add a new structure within city 200, a set of map overlays presenting the impact of the area of effect of the structure and/or the cost of the structure may be presented to the user. For example, the size and the shape that the area of effect that the desired structure would have may be presented in a similar fashion to areas of effect 212, 214, 216, and/or 218 along with cost information associated with positioning the structure at a desired location.

Figure 3:
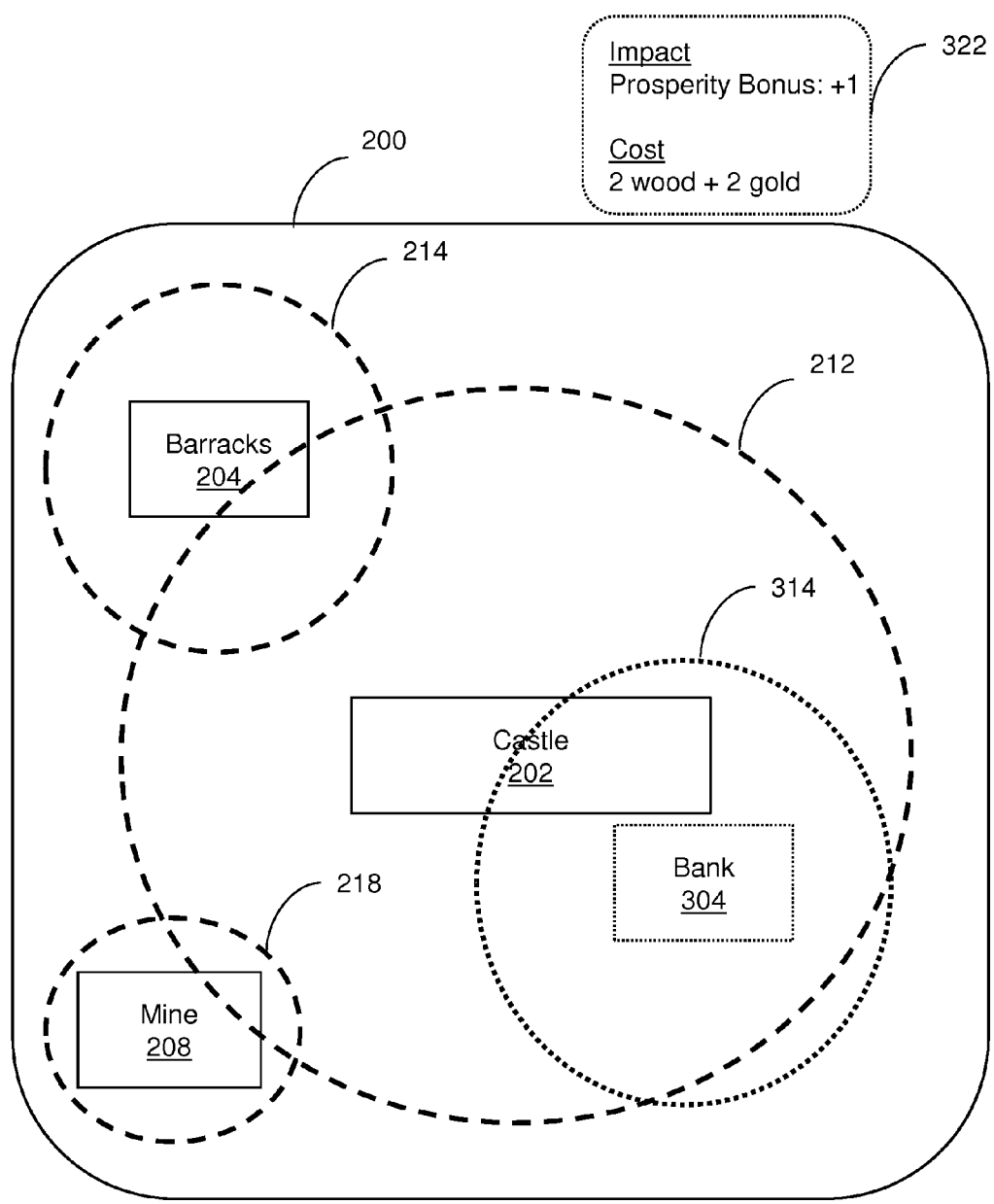
FIG. 3 illustrates a game scenario on a client computing platform depicting a map overlay, in accordance with one or more implementations.

FIG. 3 illustrates a game scenario of a city 200 generated by a server and presented on a client computing platform in response to in-game actions performed by a user, in accordance with one or more implementations, with a map overlay presented thereon. As shown, a user has selected to build a bank 304, and the size and shape that its area of effect 314 would have is presented to the user overlaying the existing city map, along with information 322 pertaining to the cost of building the bank in that location and the impact within its area of effect. In some implementations, the varying cost and impact of building the bank in various locations in the city may be shown with an overlay covering the entire city map and showing where costs and impacts are greatest and least. This may be accomplished in any number of ways, for example the overlay could be a heat map showing the most impactful locations in red and the least impactful as blue, or the most costly in red and least costly in blue. Using this heat map, the user may position a cursor over an area showing the most impact and/or least cost to see the exact impact and cost of building at locations within that area, which may be presented for example as shown in FIG. 3.

Figure 4:
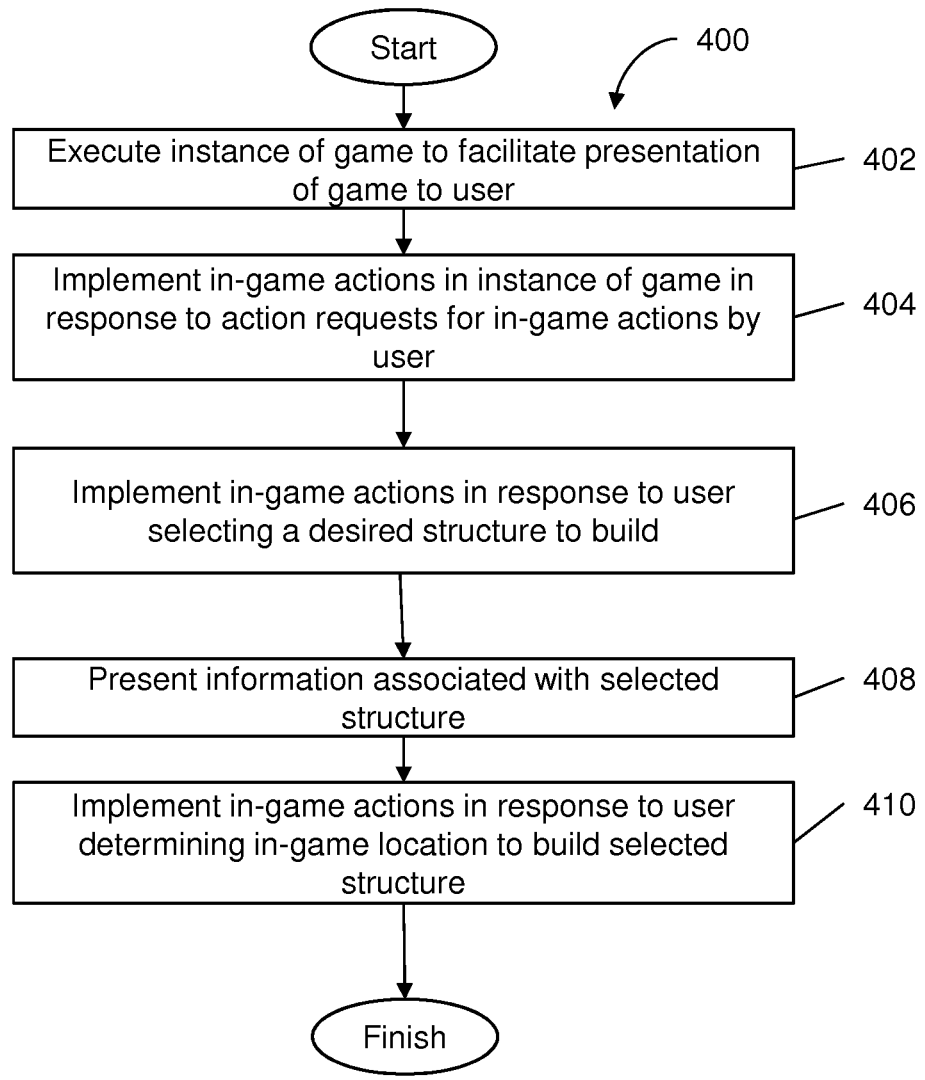
FIG. 4 illustrates a method for an area of effect impacting a game, in accordance with one or more implementations.

FIG. 4 illustrates a method for building a city in response to areas of effect associated with structures hosted to client computing devices for interaction by users, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a game may be executed to facilitate presentation of the game to a user. The game, for instance, may include parameters including a size and/or type of virtual space the game will be played on, the number of players, resource types, user-controlled elements, and/or buildings initially allocated to users. Operation 402 may be performed by a game module that is the same as or similar to game module 106, in accordance with one or more implementations.

At an operation 404, in-game actions may be implemented in the instance of the game in response to action requests by the user. The in-game actions may include the user moving user-controlled elements, constructing a city, and/or viewing information associated with an area of effect of a structure. Operation 404 may be performed by a game module that is the same as or similar to game module 106, in accordance with one or more implementations.

At an operation 406, the user may perform in-game actions associated with selecting a desired structure to build. The user may desire to build a structure to help gather hard resources located in close proximity to a city, to adjust soft resources associated with character units, or for any other reason. The user may select a structure to build in-game via actions performed by the user on an interface of a client computing platform. Operation 406 may be performed by a city module that is the same as or similar to city module 110, in accordance with one or more implementations.

At an operation 408, the user may perform in-game actions to be presented with information for the desired structure that is based on a proposed placement of the structure within the city. The information may include a cost in in-game hard resources that is a function of the location of the structure in relation to other structures in-game. The information presented to the user may also include an area of effect that the structure would have, and an impact that the structure would have over the area of effect. Operation 408 may be performed by a map overlay module that is the same as or similar to map overlay module 114, in accordance with one or more implementations.

Responsive to cost information and area of effect information presented to the user at operation 408, at an operation 410 the user may perform in-game actions to select a location where the user desires to place the structure. Operation 410 may be performed by a city module that is the same as or similar to city module 110, in accordance with one or more implementations.

Figure 5:
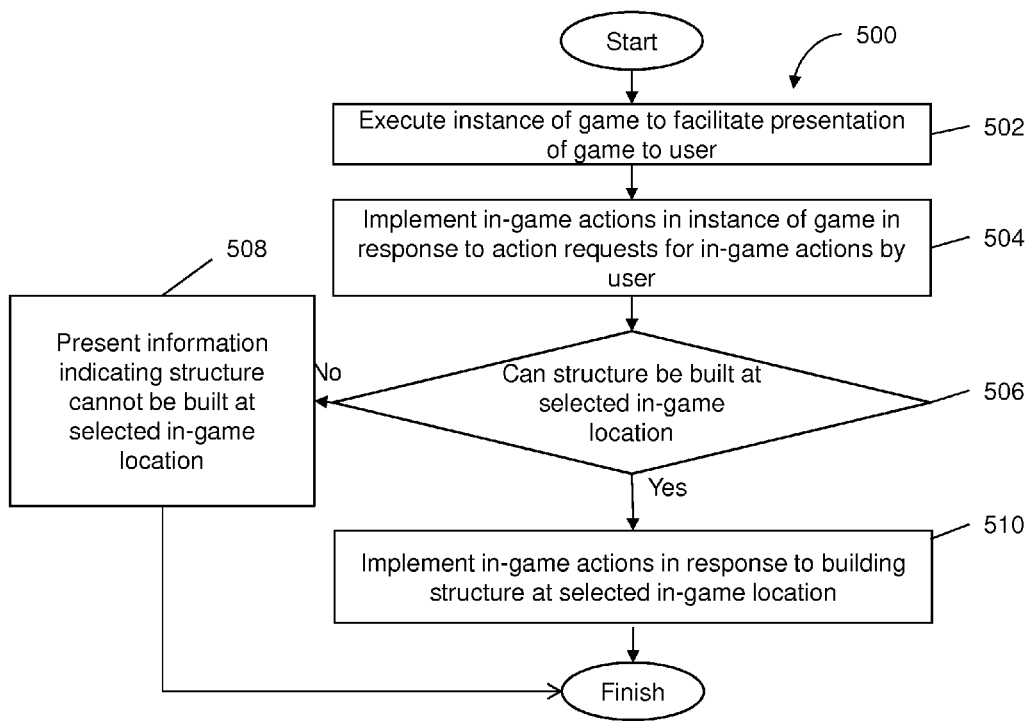
FIG. 5 illustrates a method of an area of effect impacting a cost of other structures within the area of effect, in accordance with one or more implementations.

FIG. 5 illustrates a method for building a city in response to areas of effect associated with structures hosted to client computing devices for interaction by users, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an instance of a game may be executed to facilitate presentation of the game to a user. The game, for instance, may include parameters including a size and/or type of virtual space the game will be played on, the number of players, resource types, user-controlled elements, and/or buildings initially allocated to users. Operation 502 may be performed by a game module that is the same as or similar to game module 106, in accordance with one or more implementations.

At an operation 504, in-game actions may be implemented in the instance of the game in response to action requests by the user. The in-game actions may include the first user moving user-controlled elements, constructing a city, and/or selecting a structure to build. Operation 504 may be responsive to the user selecting a structure to build via in-game actions performed by the user on an interface of a client computing platform. Operation 504 may be performed by a game module that is the same as or similar to city module 110, in accordance with one or more implementations.

At an operation 506, a determination of whether the user may build a structure at a selected in-game location may be made. The determination may be made in response to whether the user desires to build the structure within an area of effect associated with another structure and/or if other prerequisite structures are already built. Operation 504 may be performed by an area of effect module that is the same as or similar to area of effect module 112, in accordance with one or more implementations.

At an operation 508, responsive to a determination that the user has not performed in-game actions to build prerequisite structures and/or that the user desires to build a structure outside of a required area of effect associated with another structure, information to be presented on a display of a client computing platform may be transmitted to the client computing platform indicating that the structure is unable to be placed at the location where the user desires to place the structure. In implementations, further information to be displayed on the display of the client computing platform may be transmitted to the client computing platform, including information associated with structures that are required to be built before the desired structure is built and/or information associated with where the desired structure may be built. Operation 508 may be performed by an area of effect module that is the same as or similar to area of effect module 112, in accordance with one or more implementations.

At an operation 510, responsive to a determination that the user has performed in-game actions to build structures and/or the user desires to build the structure within a required area of effect associated with another structure, the user may perform in-game actions to build the desired structure at the desired location. Operation 510 may be performed by an area of effect module that is the same as or similar to area of effect module 112, in accordance with one or more implementations.

Figure 6:
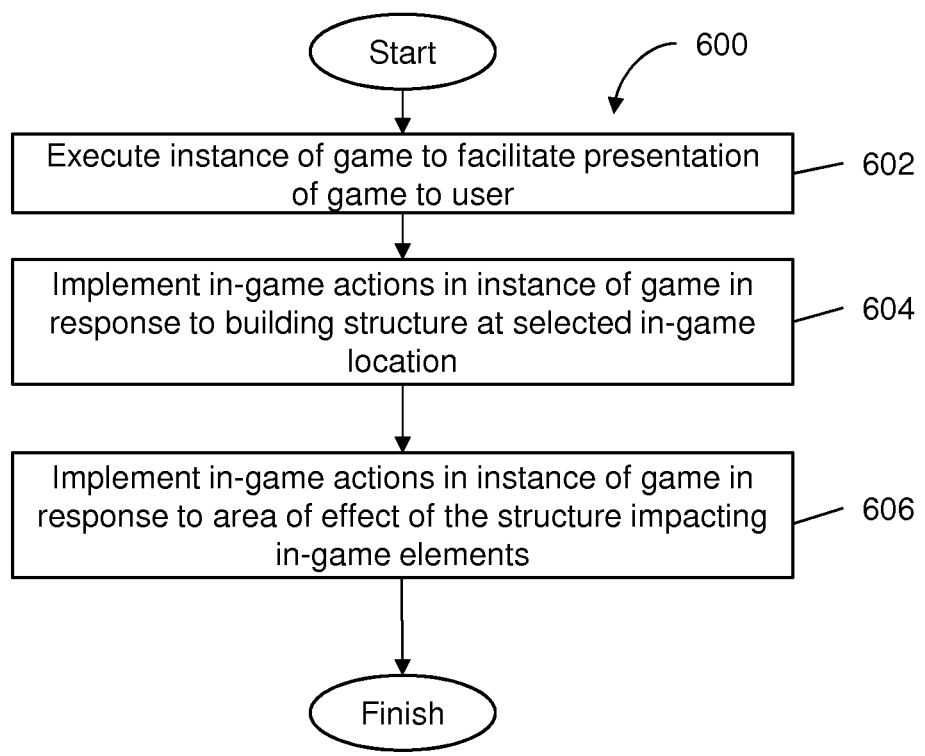
FIG. 6 illustrates a method of an area of effect impacting in-game capabilities of a user, in accordance with one or more implementations.

FIG. 6 illustrates a method for building a city in response to areas of effect associated with structures hosted to client computing devices for interaction by users, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an instance of a game may be executed to facilitate presentation of the game to a user. The game, for instance, may include parameters including a size and/or type of virtual space the game will be played on, the number of players, resource types, user-controlled elements, and/or buildings initially allocated to users. Operation 602 may be performed by a game module that is the same as or similar to game module 106, in accordance with one or more implementations.

At an operation 604, in-game actions may be implemented in the instance of the game in response to action requests by the user. The in-game actions may include the first user moving user-controlled elements, constructing a city, and/or selecting a structure to build. Operation 604 may be responsive to the user selecting a structure to build and building the structure via in-game actions performed by the user on an interface of a client computing platform. Operation 604 may be performed by a game module that is the same as or similar to game module 106, in accordance with one or more implementations.

At an operation 606, responsive to the structure being built, user-controlled elements, soft resources, hard resources, and/or other elements within an area of effect of the structure may be impacted. The area of effect may increase and/or decrease the in-game capabilities of the user within the area of effect and/or modify hard and/or soft resources within the area of effect. Further, a cost of hard resources required for subsequent structures to be built within the area of effect may be adjusted in response to the structure being built. Operation 606 may be performed by an area of effect module that is the same as or similar to area of effect module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that presents effects of a proposed in-game structure having an area of effect in a game, the system comprising:
   one or more physical computer processors configured to execute computer program modules, the computer program modules comprising:
   a game module configured to execute an instance of a game to facilitate presentation of the game to a user through a game interface, the game module being configured to implement in-game actions in the instance of the game in response to action requests for the in-game actions by the user, wherein the game is conducted in a virtual game space defined by the instance;
   a communication module configured to obtain action requests input by the user to the game interface, wherein the action requests request a requested structure be built in the game at a proposed in-game structure location within the virtual game space; and
   an area of effect module configured to:
      determine an area of effect associated with the requested structure, the area of effect being a spatial region in the virtual game space around the proposed in-game structure location; and
      determine impacts of the requested structure on any existing structures within the area of effect with respect to one or more of resource accumulation, structure properties, or event frequency of such existing structures within the area of effect; and
   a map overlay module configured to facilitate presentation, in the game interface, of the area effect associated with the requested structure, the presentation including visual representation of the impacts of the requested structure on the one or more of resource accumulation, structure properties, or event frequency for such existing structures within the area of effect.

2. The system of claim 1, wherein the area of effect module is configured such that the determined impacts within the area of effect include adjustments to a cost in hard resources to build other structures within the area of effect, and wherein the map overlay module is configured to facilitate presentation of such adjustments.

3. The system of claim 2, wherein the cost in hard resources for building other structures within the area of effect of the structure is a function of a structure type of the requested structure.

4. The system of claim 1, wherein the area of effect module is configured such that the determined impacts within the area of effect include adjustment of at least one of a rate at which hard resources are obtained and a change in soft resources produced by such existing structures.

5. The system of claim 1, wherein the spatial region of the area of effect extends in a circle around a center of the requested structure, the radius of the circle being a function of a structure type of the requested structure.

6. The system of claim 1, wherein a second structure can only be built within the area of effect but other structures can be built outside the area of effect.

7. The system of claim 1, wherein the area of effect module is configured such that the determined impacts within the area of effect increase or decrease at least one of a rate at which the requested structure produces soft resources and a rate at which hard resource are obtained.

8. The system of claim 1, wherein the area of effect module is configured such that the determined impacts within the area of effect increase or decrease the frequency at which at least one of a negative and a positive event occurs therein.

9. The system of claim 1, wherein the area of effect module is configured such that the determined impacts within the area of effect increase or decrease the effectiveness of first existing structure therein in carrying out an intended functionality.

10. A computer-implemented method for facilitating an area of effect in a game, the method being implemented in a computer system that includes one or more physical processors executing computer program modules, the method comprising:
   executing an instance of a game to facilitate presentation of the game to a user through a game interface, the game being conducted in a virtual game space defined by the instance;
   obtaining action requests input by the user to the game interface, wherein action requests specify execution of in-game actions by the user;
   implementing the in-game actions in the instance of the game to facilitate presentation of the game to the user, wherein the in-game actions specified by the action requests specify a requested structure to be built in the game at a proposed structure location within the virtual game space;

determining an area of effect associated with the requested structure, the area of effect being a spatial region in the virtual game space around the proposed structure location;

determining impacts of the requested structure on any existing structures within the area of effect with respect to one or more of resource accumulation, structure properties, or event frequency of such existing structures within the area of effect; and facilitating presentation, in the game interface, of the area effect associated with the requested structure, the presentation including visual representation of the impacts of the requested structure on the one or more of resource accumulation, structure properties, or event frequency for such existing structures within the area of effect.

11. The method of claim 10, further comprising:
adjusting a cost in hard resources to build other structures within the area of effect.

12. The method of claim 11, wherein the cost in hard resources for building the other structures within the area of effect of the structure is a function of a structure type of the requested structure.

13. The method of claim 10, wherein the impacts further comprise:
adjustment of at least one of a rate at which hard resource are obtained and a change in soft resources produced by structures.

14. The method of claim 10, wherein the spatial region associated with area of effect is a circle around a center of the requested structure, the radius of the circle being a function of a structure type of the requested structure.

15. The method of claim 10, wherein a second structure can only be built within the area of effect but other structures can be built outside the area of effect.

16. The method of claim 10, wherein the impacts of the requested structure include increases or decreases at least one of a rate at which a first existing structure within the area of effect produces soft resources and a rate at which hard resources are obtained.

17. The method of claim 10, wherein the area of effect of the requested structure increases or decreases the frequency at which at least one of a negative and a positive event occurs therein.

18. The system of claim 10, wherein the impacts of the requested structure increases or decreases the effectiveness of a first existing structure within the area of effect carrying out an intended functionality.

* * * * *